(12) United States Patent
Huo

(10) Patent No.: US 12,187,236 B2
(45) Date of Patent: Jan. 7, 2025

(54) CAR-MOUNTED BIKE RACK

(71) Applicant: NINGBO CHENFAN AUTO ACCESSORIES CO., LTD, Zhejiang (CN)

(72) Inventor: Shouguang Huo, Zhejiang (CN)

(73) Assignee: NINGBO CHENFAN AUTO ACCESSORIES CO., LTD, Zhejiang (CN)

( * ) Notice: Subject to any disclaimer, the term of this patent is extended or adjusted under 35 U.S.C. 154(b) by 141 days.

(21) Appl. No.: 18/071,575

(22) Filed: Nov. 29, 2022

(65) Prior Publication Data
US 2024/0001862 A1    Jan. 4, 2024

(30) Foreign Application Priority Data
Jun. 29, 2022   (CN) .......................... 202210747372.5

(51) Int. Cl.
*B60R 9/10*    (2006.01)
(52) U.S. Cl.
CPC ..................... *B60R 9/10* (2013.01)
(58) Field of Classification Search
CPC ....................................................... B60R 9/10
USPC ........................................................ 224/924
See application file for complete search history.

(56) References Cited

U.S. PATENT DOCUMENTS

| | | | | |
|---|---|---|---|---|
| 5,645,394 A * | 7/1997 | Hays | ....................... | B60P 1/435 414/537 |
| 8,272,547 B1 * | 9/2012 | Mital | ....................... | B60R 9/10 224/501 |
| 9,663,040 B1 * | 5/2017 | Shen | ....................... | B60R 9/10 |
| 10,688,866 B2 * | 6/2020 | Guo | ....................... | B60K 6/387 |
| 11,383,652 B1 * | 7/2022 | Huang | ....................... | B60R 9/10 |
| 2009/0120984 A1 * | 5/2009 | Sautter | ....................... | B60R 9/10 224/532 |
| 2016/0068111 A1 * | 3/2016 | Walker | ....................... | B60R 9/10 224/521 |
| 2017/0349111 A1 * | 12/2017 | Ramsdell | ....................... | B60R 9/06 |

FOREIGN PATENT DOCUMENTS

CN    213768420    7/2021

* cited by examiner

*Primary Examiner* — Scott T McNurlen
(74) *Attorney, Agent, or Firm* — Bayramoglu Law Offices LLC

(57) ABSTRACT

A car-mounted bike rack includes a connecting beam and at least one support beam, wherein the support beam is fixedly disposed on the connecting beam, a front wheel fixing assembly and a rear wheel fixing assembly are disposed on the support beam, the front wheel fixing assembly comprises an arc-shaped support plate and a clamping mechanism, a convex arc surface of the arc-shaped support plate is rotatably connected to an upper surface of the support beam, and the clamping mechanism is rotatably connected to a side face of the support beam and is matched with a concave arc surface of the arc-shaped support plate to lock a front wheel of a bike.

9 Claims, 16 Drawing Sheets

CAR-MOUNTED BIKE RACK

CROSS-REFERENCE TO RELATED APPLICATION

This application claims the priority benefit of China application serial no. 202210747372.5, filed on Jun. 29, 2022. The entirety of the above-mentioned patent application is hereby incorporated by reference herein and made a part of this specification.

BACKGROUND

Technical Field

The invention belongs to the technical field of car accessories, and particularly relates to a car-mounted bike rack.

Description of Related Art

With the improvement of the socioeconomic level, various family cars and commercial cars are used more widely. These cars not only can carry people, but also can carry travel articles such as luggage and tents on a roof rack at the top of the cars. However, it is inconvenient to carry bikes on the roof rack.

In order to carry bikes with cars easily, the applicant has provided a car-mounted bike rack, in Patent Application No. CN202022633185.3, which comprises a connecting beam, a support beam, a rear wheel fixing assembly and a front wheel fixing assembly, wherein the connecting beam is connected to the tail of a car through a mounting tube; when a bike is loaded onto the bike rack, the bike needs to be lifted to make the front wheel of the bike aligned with the front wheel fixing assembly and make the rear wheel of the bike aligned with the rear wheel fixing assembly; and then, the bike is placed down, such that the front wheel of the bike is fixed by the front wheel fixing assembly, and the rear wheel of the bike is fixed by the rear wheel fixing assembly. Although this car-mounted bike rack is more convenient to use compared with the roof rack, it is laborious to lift the bike and to align the front and rear wheels with the front and rear wheel fixing assemblies, and an arc support plate in the front wheel fixing assembly may be damaged in case of misalignment, leading to damage to the arc support plate; and this car-mounted bike rack is inconvenient to install and needs to be further improved.

SUMMARY

The technical issue to be settled by the invention is to provide a car-mounted bike rack easy to install.

The technical solution adopted by the invention to settle the above technical issue is as follows: a car-mounted bike rack comprises a connecting beam and at least one support beam, wherein the support beam is fixedly disposed on the connecting beam, a front wheel fixing assembly and a rear wheel fixing assembly are disposed on the support beam, the front wheel fixing assembly comprises an arc-shaped support plate and a clamping mechanism, a convex arc surface of the arc-shaped support plate is rotatably connected to an upper surface of the support beam, and the clamping mechanism is rotatably connected to a side face of the support beam and is matched with a concave arc surface of the arc-shaped support plate to lock a front wheel of a bike; a rear portion of the arc-shaped support plate contacts the upper surface of the support beam initially, and when the front wheel of the bike is pushed forward into the arc-shaped support plate and is further moved forward, the arc-shaped support plate turns forward until a front portion of the arc-shaped support plate contacts the support beam.

A locking mechanism is disposed on a front portion of the support beam, and is used for locking the arc-shaped support plate and the support beam after the arc-shaped support plate turns forward, such that the stability of the structure is improved.

The locking mechanism comprises a mounting base, a first bolt and a nut, wherein the mounting base is fixedly disposed on a front portion of a lower surface of the support beam, a first hole is formed in the mounting base, and a lug formed with a second hole is disposed on the convex arc surface of the arc-shaped support plate; and when the front portion of the arc-shaped support plate contacts the support beam, the second hole is communicated with the first hole, and the first bolt penetrates through the second hole and the first hole to be connected to the nut in a threaded manner. In this structure, the first bolt penetrates through the second hole and the first hole to be connected to the nut in the threaded manner to lock the arc-shaped support plate and the support beam after the arc-shaped support plate turns forward, so the structure is simple, operation is easy, and the stability is good.

A front portion of the upper surface of the support beam is concaved downwards to form a locating groove matched with the convex arc surface of the arc-shaped support plate, a front end of the locating groove is communicated with a front end of the support beam, and when the arc-shaped support plate turns forward, part of the convex arc surface of the arc-shaped support plate is clamped in the locating groove, such that the stability is good.

A detachable support plate is disposed at a rear end of at least one support beam, and a rear end of the support plate contacts the ground. In this structure, by adoption of the support plate, the bike can be directly pushed onto the support beam from the ground through the support plate and can be lifted not entirely by means of manpower; the front wheel of the bike can be fixed rapidly through the rotatable arc-shaped support plate, and installation is more convenient and effortlessly; moreover, the support plate can be detached to be tied on the support beam when not used, so a little space is occupied.

A groove is formed in a rear end of the support beam, the support plate comprises an upper connecting plate and a lower connecting plate, a hook matched with the groove is disposed at an upper end of the upper connecting plate, oblique side baffles are disposed on two sides of the upper connecting plate, an upper end of the lower connecting plate is rotatably connected to a back side of the upper connecting plate, a first bolt hole and a second bolt are disposed on the lower connecting plate, and the second bolt penetrates through the first bolt hole to contact a lower end of the upper connecting plate. In this structure, the support plate can be unfolded to be used or folded to be stored, thus being convenient to use.

The clamping mechanism comprises a swing arm and a clasp, wherein one end of the swing arm is rotatably connected to a side face of the support beam, a connecting end of the clasp is slidably disposed on the swing arm, and the clasp is locked on the swing arm through a locking assembly; and when the swing arm is rotated to a preset angle, the clasp is slid to be matched with the arc-shaped support plate to clamp the front wheel of the bike. Operation is easy, and using is convenient.

The car-mounted bike rack further comprises a mounting tube connected to the tail of a car, wherein a folding seat is fixedly disposed on the mounting tube, one end of the connecting beam is connected to the folding seat, and the connecting beam can be rotatably folded in the vertical direction with respect to the folding seat. In this structure, the folding seat is arranged to allow the connecting beam to rotate vertically, such that the car-mounted bike rack can be folded to be stored, the bike can be installed easily, or the trunk can be opened easily.

The folding seat is formed with two slots, one of the slots is horizontal, the other slot is vertical, a casing sleeving the folding seat is fixedly disposed at one end of the connecting beam and is rotatably connected to the folding seat through a connecting shaft, the connecting beam is rectangular, a slider capable of sliding in the length direction and a first connecting rod are disposed in the connecting beam, a strip-shaped hole and a stop plate are disposed at a lower end of the connecting beam, a third hole is formed in the stop plate, a lower end of the slider stretches out of the strip-shaped hole and is connected to a second connecting rod, the second connecting rod penetrates through the third hole and is connected to a stop block, the stop block is inserted into any one of the slots, a compression spring is disposed between the stop block and the stop plate and is used for restoration, one end of the first connecting rod is fixedly connected to the slider, and the other end of the first connecting rod stretches out from the other end of the connecting beam and is connected to a handle. In this structure, the first connecting rod, the slider, the second connecting rod, and the stop block are pulled to slide forwards or backwards through the handle to enable the stop block to be inserted into any one slot or disengage from the slot, such that operation is easy and convenient.

A fourth hole is formed in a left side of the mounting tube, an opening is formed in an upper surface of the mounting tube, an ejection block and a push block are disposed in the mounting tube, a fifth hole and a first oblique guide surface inclining upward from left to right are disposed on the ejection block, a second bolt hole and a second oblique guide surface inclining downward from right to left are disposed on the push block, a third bolt sequentially penetrates through the fourth hole and the fifth hole to be connected to the second bolt hole in a threaded manner, the first oblique guide surface contacts the second oblique guide surface, and when the third bolt is rotated to enable the push block to move leftward, the ejection block moves upward and stretches out via the opening. When the car-mounted bike rack is connected to the tail of the car, the mounting tube is inserted into the connecting tube at the tail of the car first, the third bolt penetrates through the side face of the connecting tube, the fourth hole and the fifth hole to be connected to the second bolt hole in a threaded manner, then the third bolt is tightened and is matched with the push block to clamp the side wall of the connecting tube, the side wall of the mounting tube and the ejection block therebetween; meanwhile, ejection block is ejected upwards by the push block, and the upper end of the push block abuts against the inner wall of the connecting tube, so that the purpose of dual-locking is fulfilled, and the connecting stability of the mounting tube and the connecting rod at the tail of the car is greatly improved.

Compared with the prior art, the invention has the following advantages: the rear portion of the arc-shaped support plate contacts the upper surface of the support beam initially; when the bike is installed, the front wheel of the bike is lifted and is then placed on the support beam, then the bike is pushed forwards to push the front wheel of the bike into the arc-shaped support plate from back to front and then is moved forwards, and the arc-shaped support plate turns forward in this process until the front portion of the arc-shaped support plate contacts the support beam, such that initial location is realized; next, the clamping mechanism is rotated and is matched with the arc-shaped support plate to lock the front wheel of the bike; and finally, the rear wheel is fixed by the rear wheel fixing assembly. Compared with conventional bike racks, the process of aligning the front wheel of the bike to a wheel carrier before placing down the bike is avoided, so installation is convenient and effortless.

DESCRIPTION OF THE EMBODIMENTS

Figure 1:
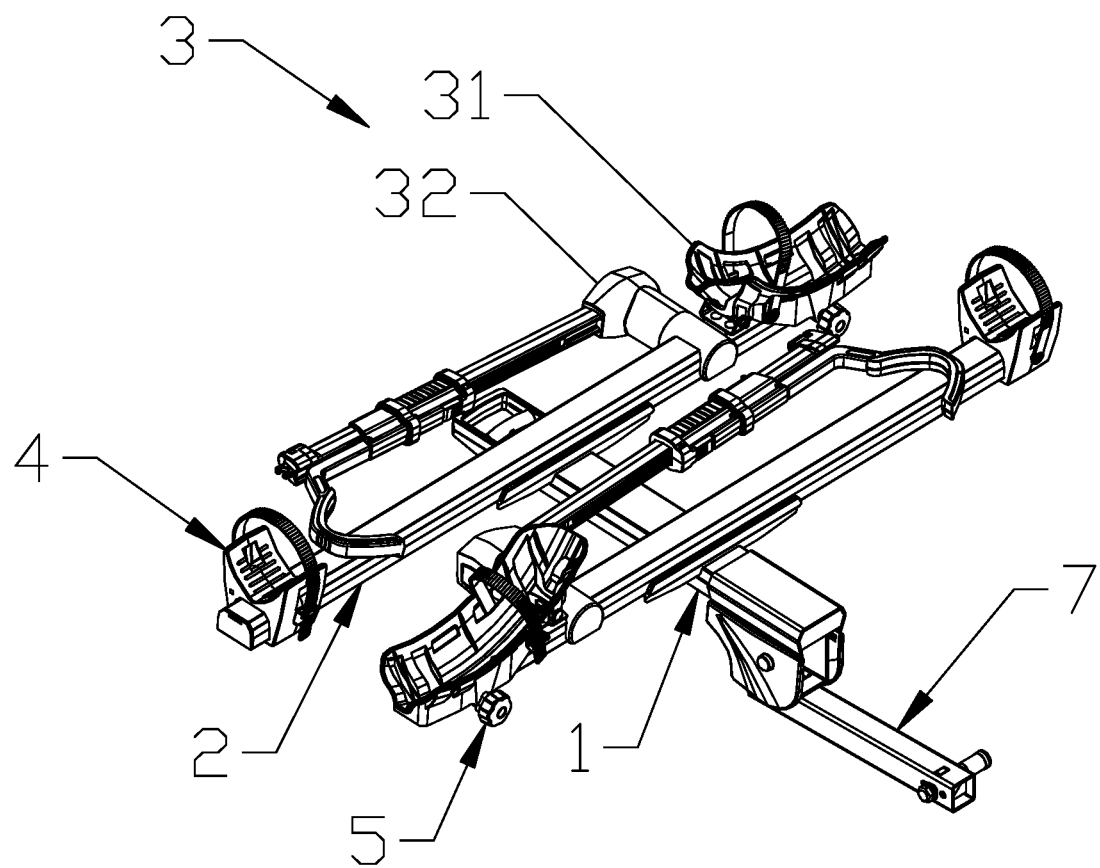
FIG. 1 is a first structural view of the invention.
Figure 2:
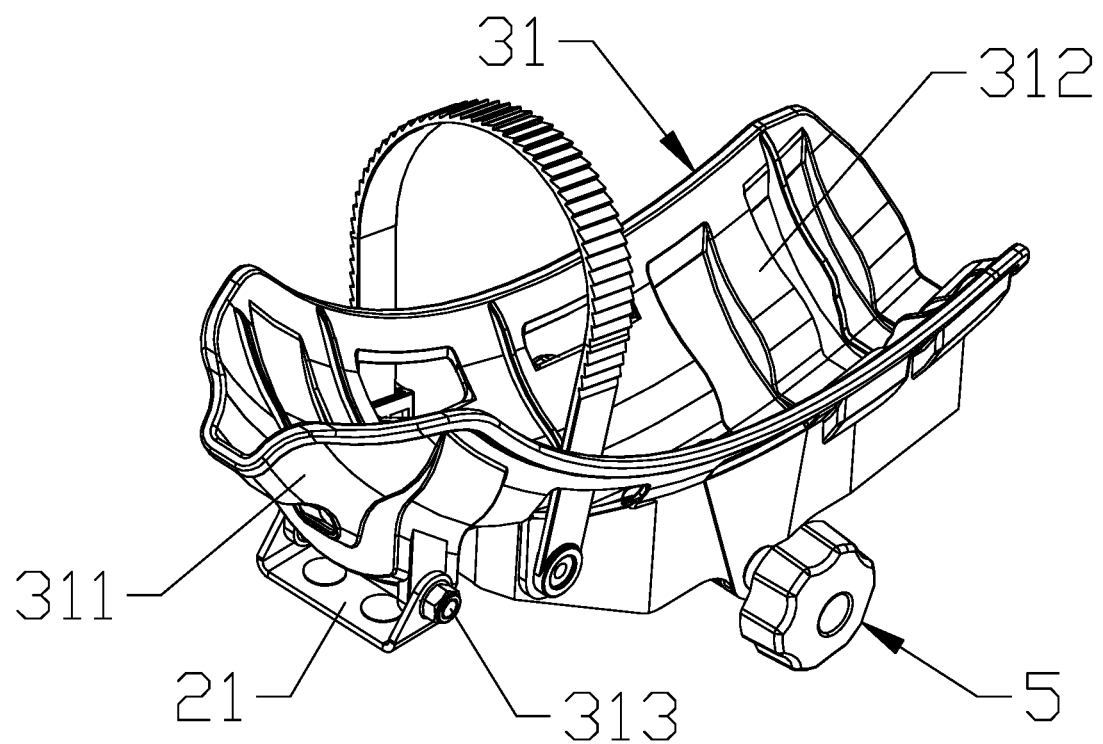
FIG. 2 is a first partial structural view of a front wheel fixing assembly according to the invention.

The invention will be described in further detail below in conjunction with accompanying drawings and embodiments.

Embodiment 1: As shown in FIG. 1-FIG. 4, a car-mounted bike rack comprises a connecting beam 1 and at least one support beam 2, wherein the support beam 2 is fixedly disposed on the connecting beam 1 and is crossed with the connecting beam 1, a front wheel fixing assembly 3 and a rear wheel fixing assembly 4 are disposed on the support beam 2, the front wheel fixing assembly 3 comprises an arc-shaped support plate 31 and a clamping mechanism 32, a convex arc surface 311 of the arc-shaped support plate 31 is rotatably connected to an upper surface of the support beam 2, and the clamping mechanism 32 is rotatably connected to a side face of the support beam 2 and is matched with a concave arc surface 312 of the arc-shaped support plate 31 to lock a front wheel of a bike; a rear portion of the arc-shaped support plate 31 contacts the upper surface of the support beam 2 initially, and when the front wheel of the bike is pushed forward into the arc-shaped support plate 31 and is further moved forward, the arc-shaped support plate 31 turns forward until a front portion of the arc-shaped support plate 31 contacts the support beam 2.

In this embodiment, a rotating seat 21 is fixedly disposed on the upper surface of the support beam 2, and a rotating shaft 313 is disposed on the convex arc surface 311 of the arc-shaped support plate 31 and is in running fit with the rotating seat 21.

In this embodiment, a front portion of the upper surface of the support beam 2 is concaved downwards to form a locating groove 22 matched with the convex arc surface 311 of the arc-shaped support plate 31, a front end of the locating groove 22 is communicated with a front end of the support beam 2, and when the arc-shaped support plate 31 turns forward, part of the convex arc surface 311 of the arc-shaped support plate 31 is clamped in the locating groove 22.

In this embodiment, the rear wheel fixing assembly 4 comprises a rear wheel carrier 41 disposed on the support beam 2, an upper side of the rear wheel carrier 41 is concaved inwards to form a wheel groove 42, and a band 43 is disposed across the wheel groove 42. After being inlaid in the wheel groove 42, the rear wheel of the bike is fixed with the band 43 to be prevented from shaking leftward and rightward, and installation is more convenient.

In this embodiment, a locking mechanism 5 is disposed on a front portion of the support beam 2, and is used for locking the arc-shaped support plate 31 and the support beam 2 after the arc-shaped support plate 31 turns forward.

Figure 3:
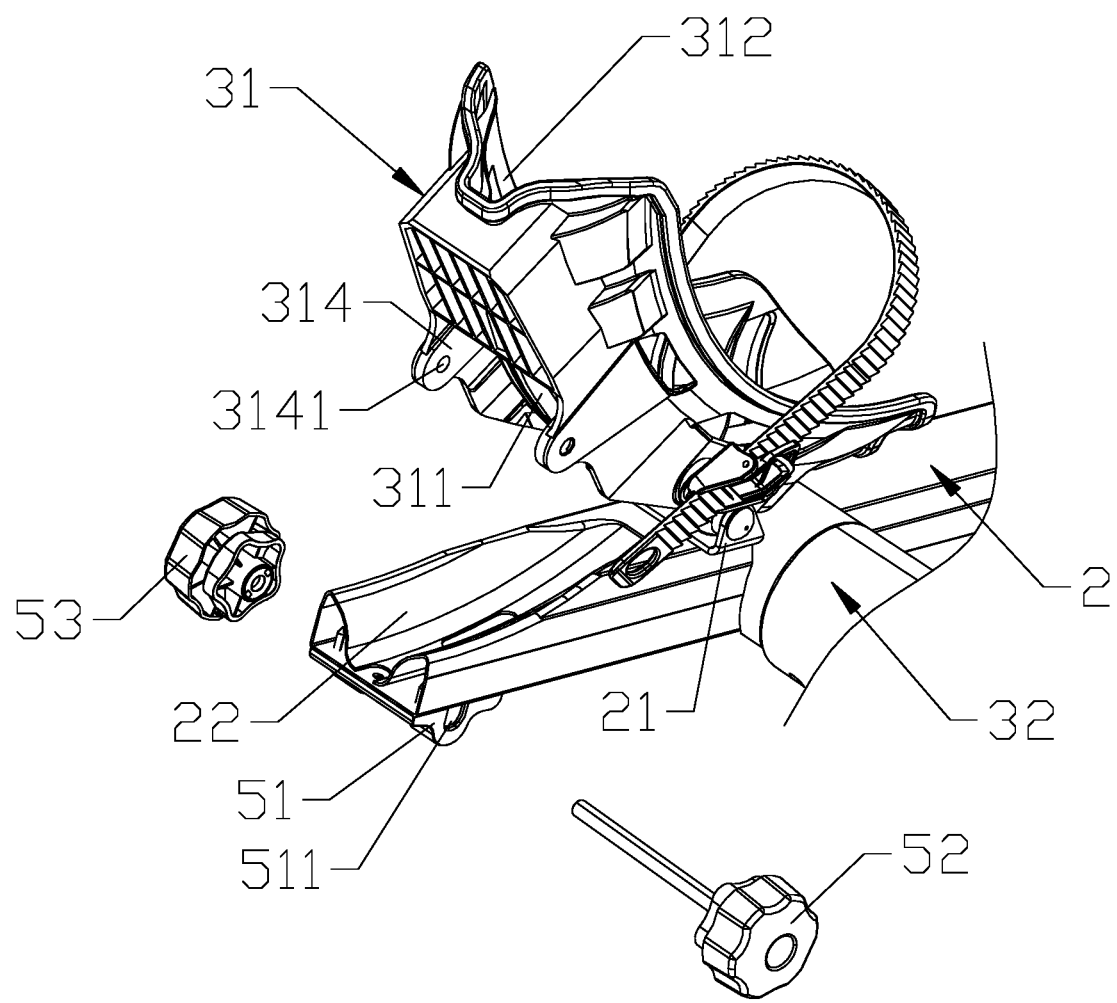
FIG. 3 is a second partial structural view of the front wheel fixing assembly according to the invention.
Figure 4:
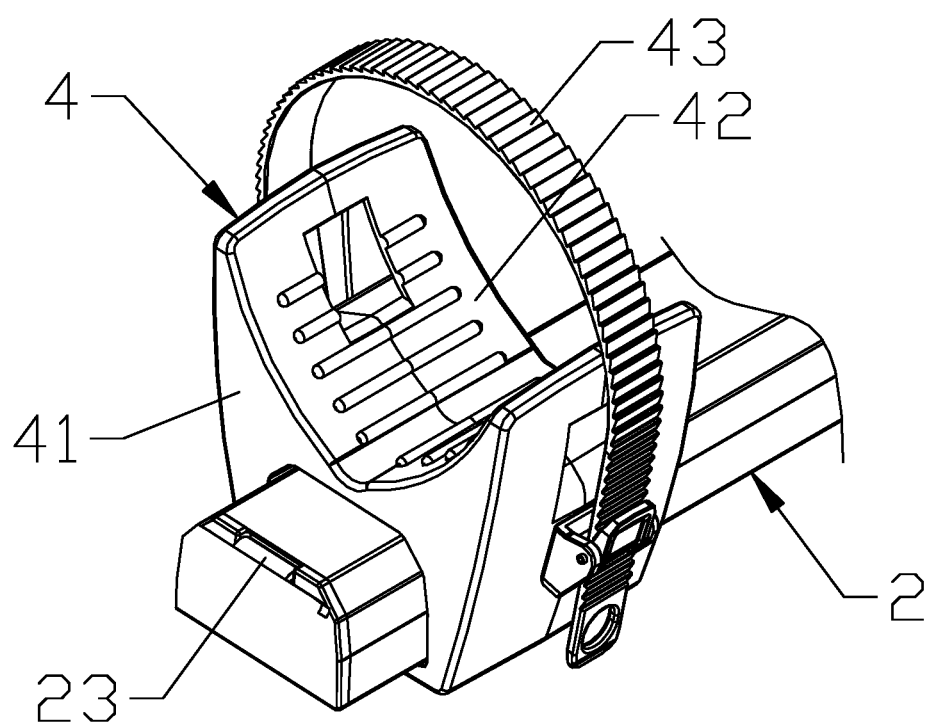
FIG. 4 is a partial structural view of a rear wheel fixing assembly according to the invention.
Figure 5:
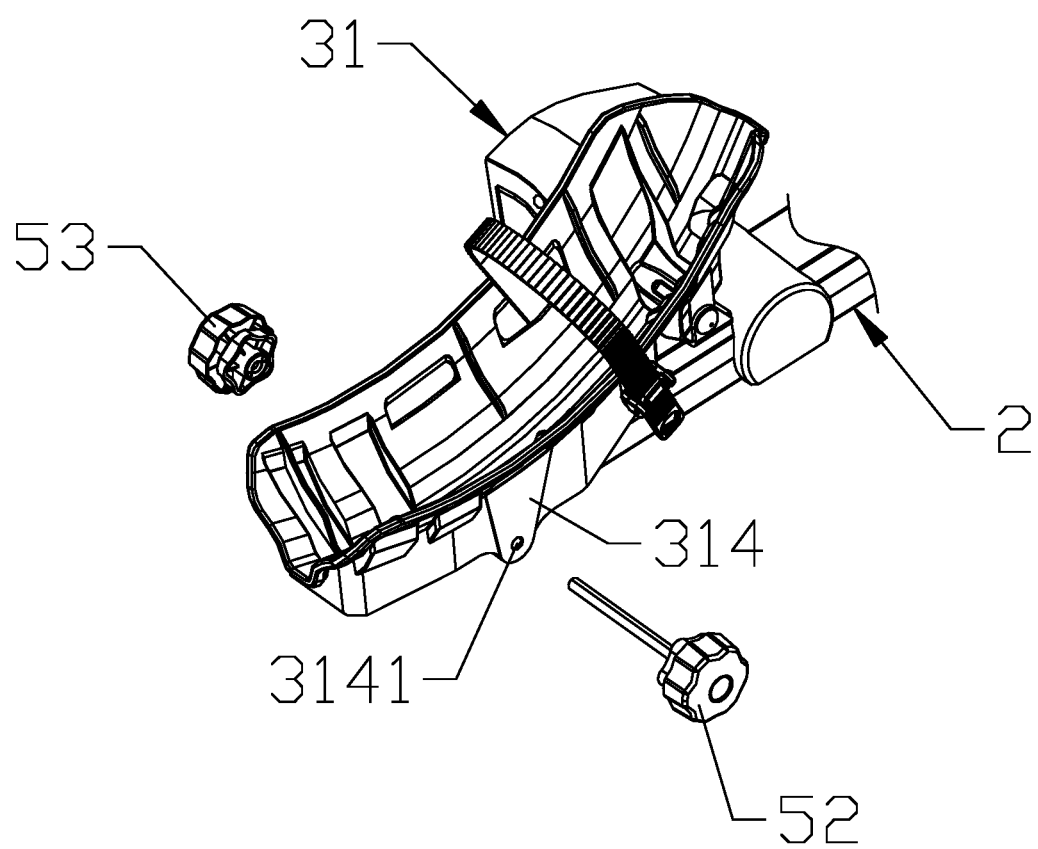
FIG. 5 is a partial exploded structural view of the front wheel fixing assembly according to the invention.

Embodiment 2: As shown in FIG. 1, FIG. 3 and FIG. 5, this embodiment is basically identical with Embodiment 1, and differs from Embodiment 1 in that the locking mechanism 5 comprises a mounting base 51, a first bolt 52 and a nut 53, wherein the mounting base 51 is fixedly disposed on a front portion of a lower surface of the support beam 2, a first hole 511 is formed in the mounting base 51, and a lug 314 formed with a second hole 3141 is disposed on the convex arc surface 311 of the arc-shaped support plate 31; and when the front portion of the arc-shaped support plate 31 contacts the support beam 2, the second hole 3141 is communicated with the first hole 511, and the first bolt 52 penetrates through the second hole 3141 and the first hole 511 to be connected to the nut 53 in a threaded manner.

Figure 6:
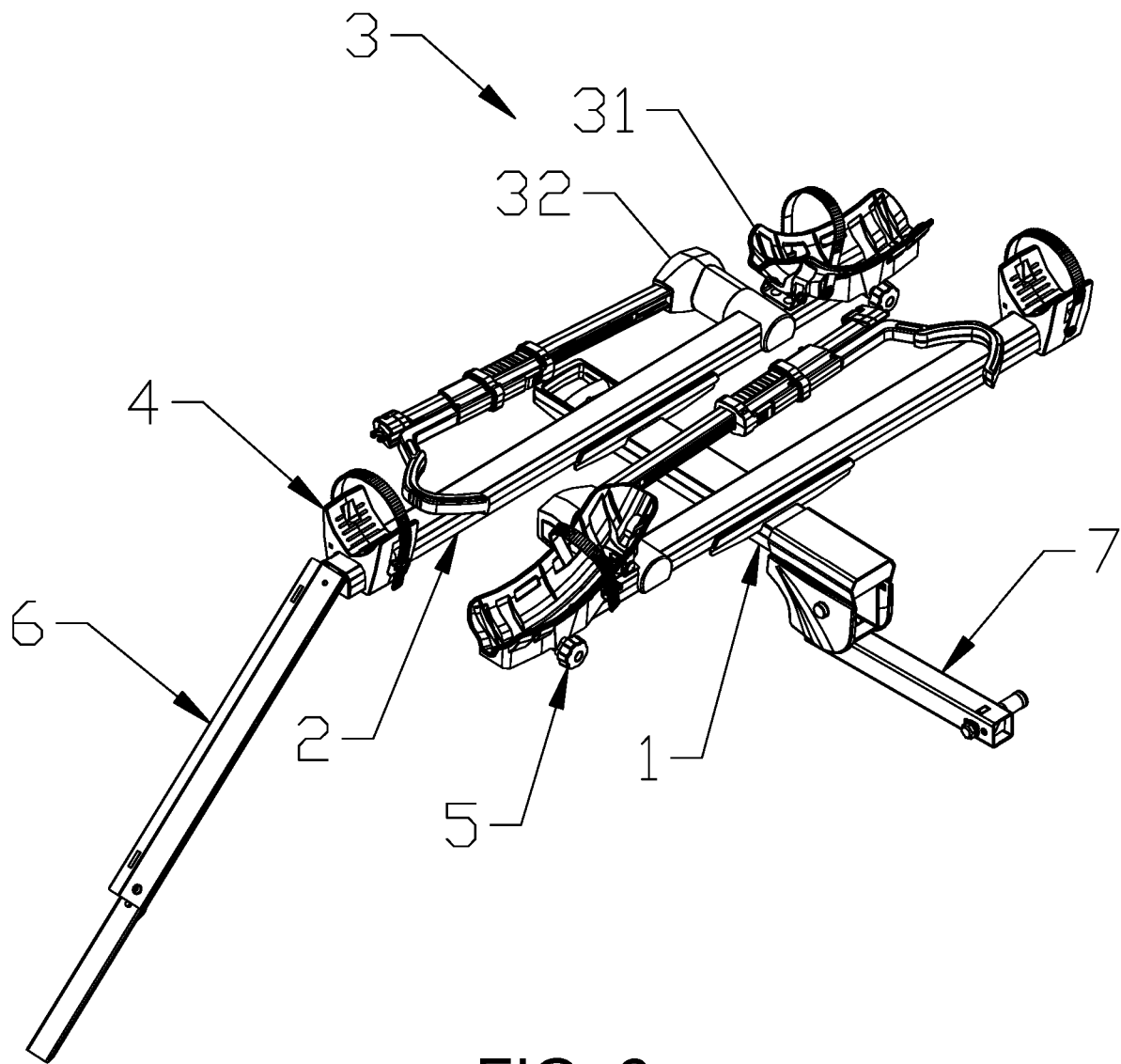
FIG. 6 is a second structural view of the invention.
Figure 7:
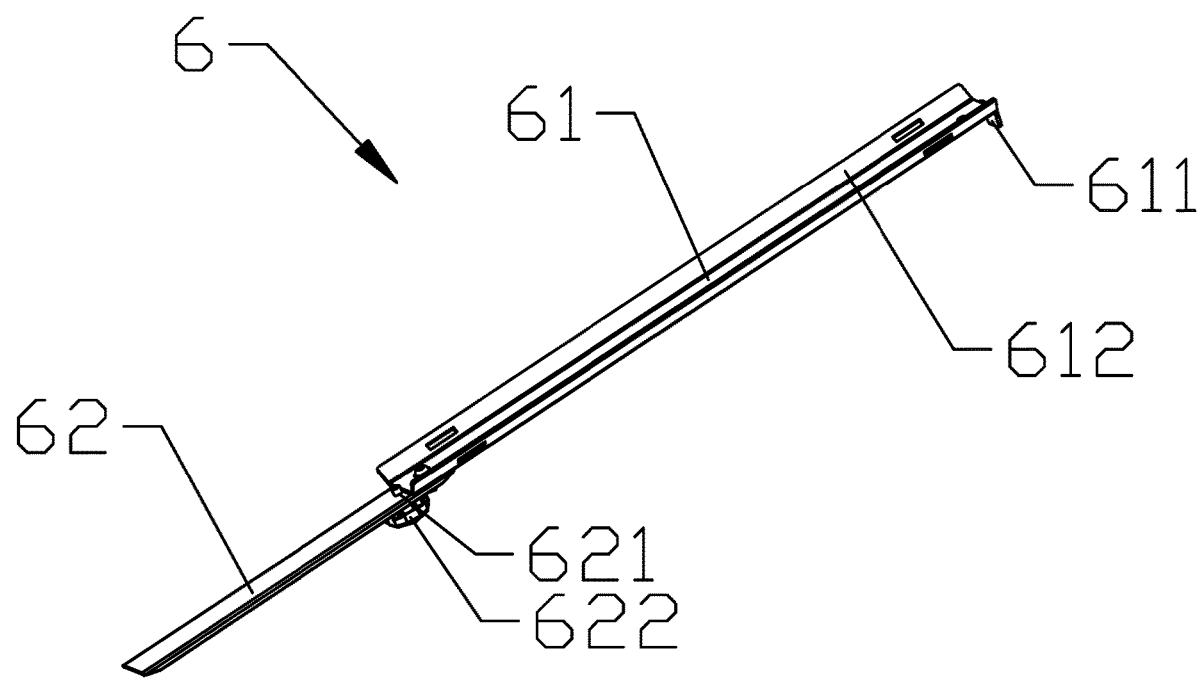
FIG. 7 is a structural view of a support plate according to the invention.

Embodiment 3: As shown in FIG. 6 and FIG. 7, this embodiment is basically identical with Embodiment 1, and differs from Embodiment 1 in that a detachable support plate 6 is disposed at a rear end of at least one support beam 2 and a rear end of the support plate 6 contacts the ground. In case of only one support plate 6, users just need to install the support plate 6 at the rear end of the support beam 2 when installing the bike on the bike rack.

In this embodiment, a groove 23 (see FIG. 4) is formed in a rear end of the support beam 2, the support plate 6 comprises an upper connecting plate 61 and a lower connecting plate 62, a hook 611 matched with the groove 23 is disposed at an upper end of the upper connecting plate 61, oblique side baffles 612 are disposed on two sides of the upper connecting plate 61, an upper end of the lower connecting plate 62 is rotatably connected to a back side of the upper connecting plate 61, a first bolt hole 621 and a second bolt 622 are disposed on the lower connecting plate 62, and the second bolt 622 penetrates through the first bolt hole 621 to contact a lower end of the upper connecting plate 61.

Figure 8:
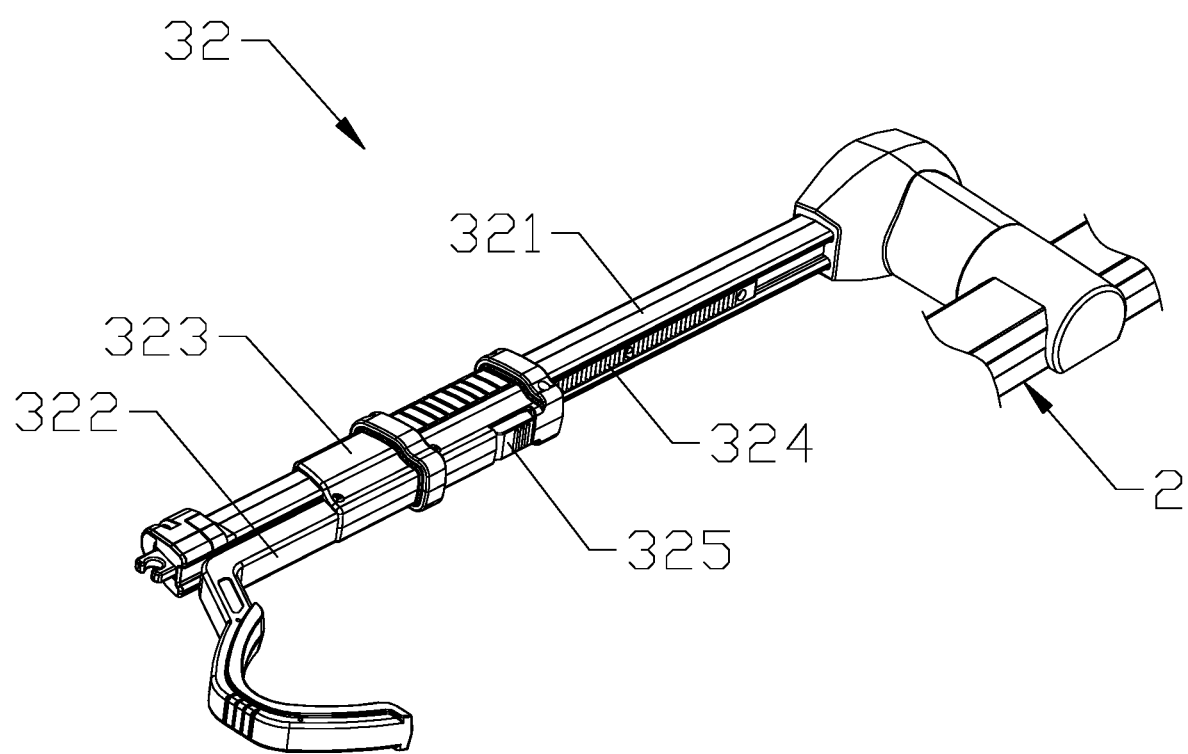
FIG. 8 is a structural view of a clamping mechanism according to the invention.
Figure 9:
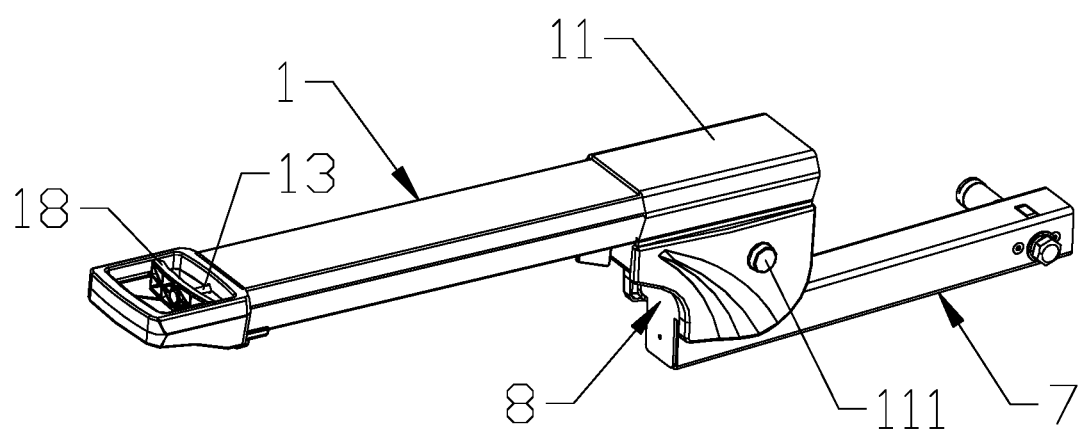
FIG. 9 is a structural diagram of a connecting beam, a mounting tube and a folding seat according to the invention.
Figure 10:
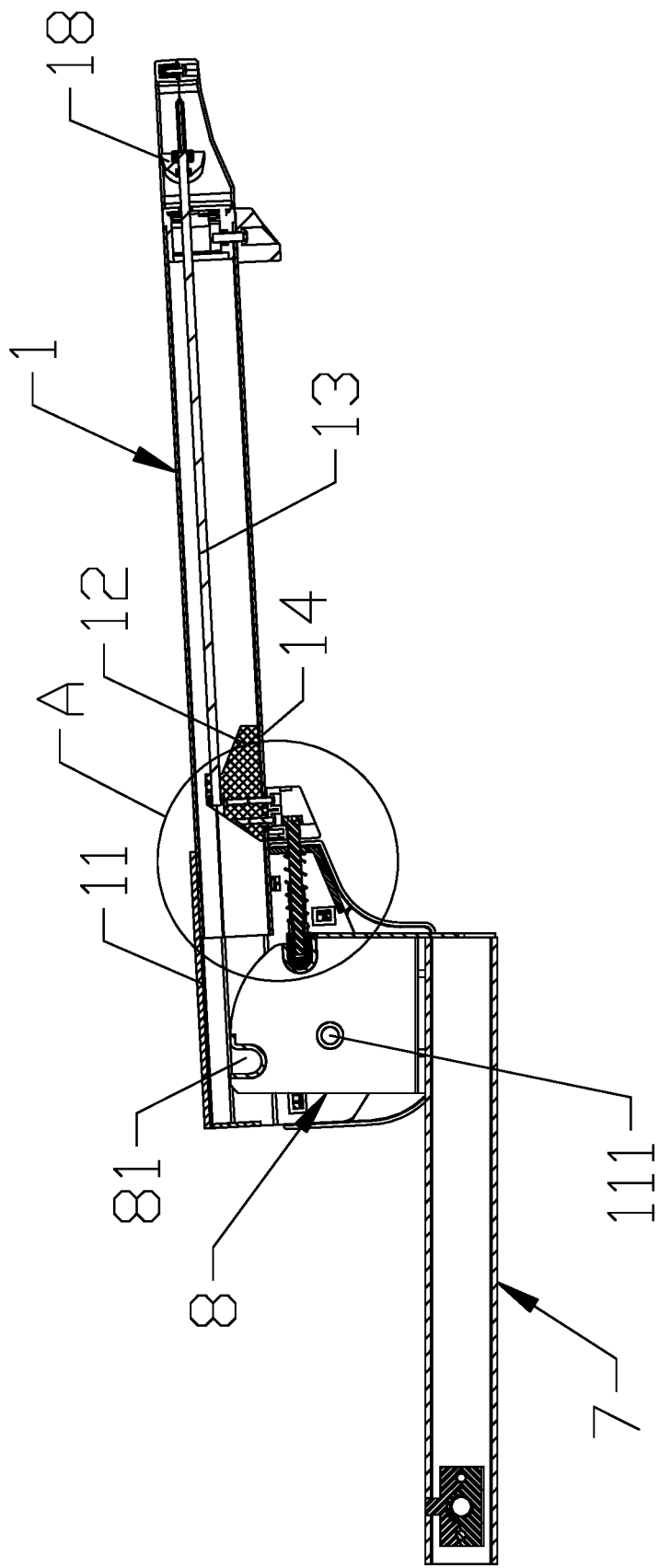
FIG. 10 is a sectional structural view of the connecting beam, the mounting tube and the folding seat according to the invention.
Figure 11:
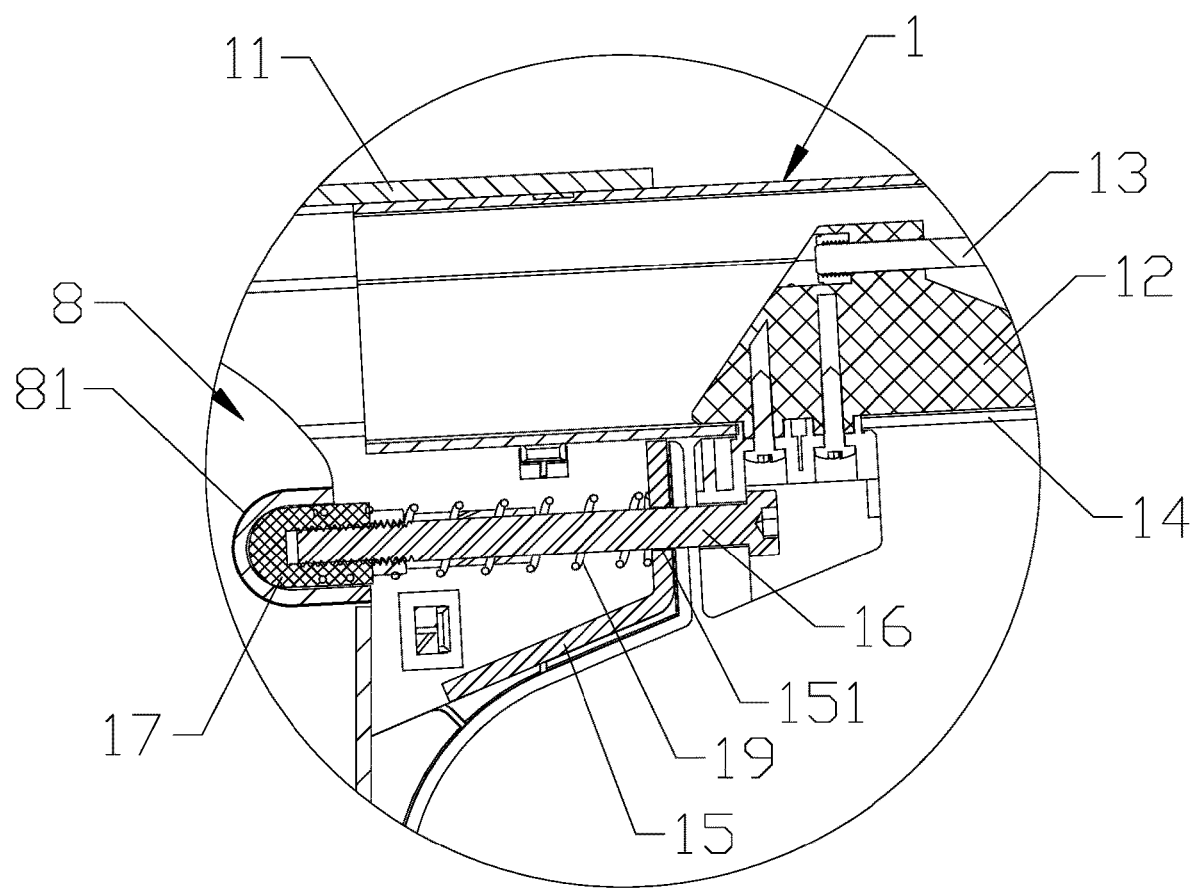
FIG. 11 is an enlarged view of part A in FIG. 10.
Figure 12:
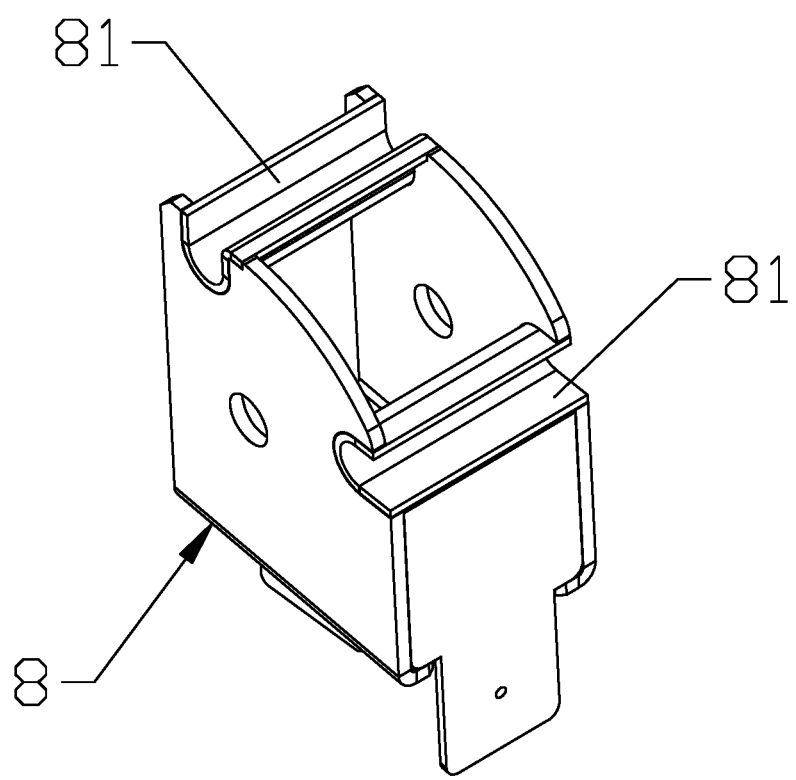
FIG. 12 is a structural view of the folding seat according to the invention.

Embodiment 4: As shown in FIG. 6 and FIG. 8, this embodiment is basically identical with Embodiment 1, and differs from Embodiment 1 in that the clamping mechanism 32 comprises a swing arm 321 and a clasp 322, wherein one end of the swing arm 321 is rotatably connected to a side face of the support beam 2, a connecting end of the clasp 322 is slidably disposed on the swing arm 321, and the clasp 322 is locked on the swing arm 321 through a locking assembly; and when the swing arm 321 is rotated to a preset angle, the clasp 322 is slid to be matched with the arc-shaped support plate 31 to clamp the front wheel of the bike.

In this embodiment, a sleeve 323 sleeving the swing arm 321 is disposed at the connecting end of the clasp 322, a strip-shaped toothed groove 324 is formed in an outer side of the swing arm 321, a rotating switch 325 is disposed on the sleeve 323, and a clamping portion (not shown) engaged with the strip-shaped toothed groove 324 is disposed at an end of the rotating switch 325; in a normal state, the clamping portion of the rotating switch 325 is engaged with the strip-shaped toothed groove 324 to restrain the sleeve 323 from moving; and when the other end, opposite to the clamping portion, of the rotating switch 325 is pressed, the clamping portion rotates outwards and disengages from the strip-shaped toothed groove 324, and then the sleeve 323 can slide along the swing arm 321 to adjust the position of the clasp 322, so as to be matched with the front wheel of bikes of different sizes. Further, a torsion spring (not shown) is disposed at the joint of the rotating switch 325 and the sleeve 323, such that the clamping portion can still be engaged with the strip-shaped toothed groove 324 when no external force is applied to the rotating switch 325.

Embodiment 5: As shown in FIG. 6, FIG. 9, FIG. 10, FIG. 11 and FIG. 12, this embodiment is basically identical with Embodiment 1, and differs from Embodiment 1 in that the car-mounted bike rack further comprises a mounting tube 7 connected to the tail of the car, a folding seat 8 is fixedly disposed on the mounting tube 7, one end of the connecting beam 1 is connected to the folding seat 8, and the connecting beam 1 can be rotatably folded in the vertical direction with respect to the folding seat 8.

Figure 13:
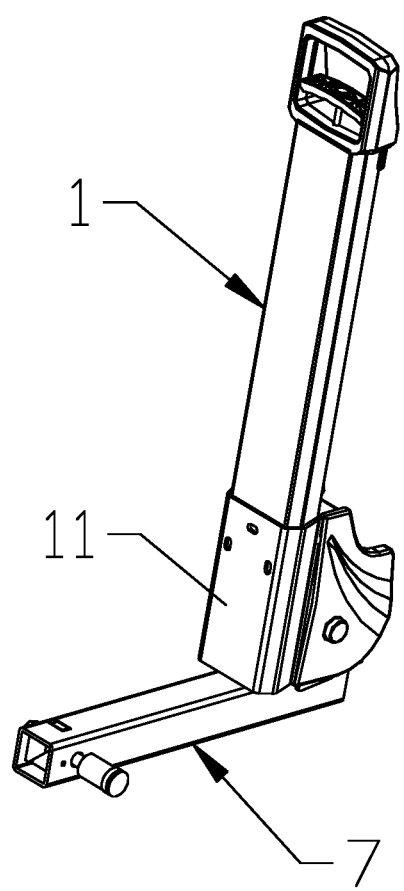
FIG. 13 is a schematic diagram of the connecting beam, the mounting tube and the folding seat in a folded state according to the invention.
Figure 14:
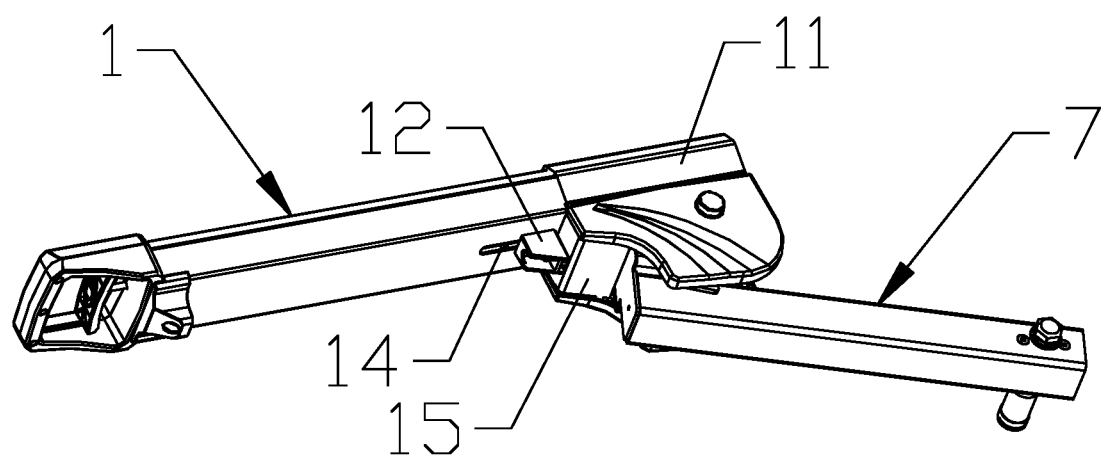
FIG. 14 is a schematic diagram of the connecting beam, the mounting tube and the folding seat in a downward inclining state according to the invention.

In this embodiment, the folding seat 8 is formed with two slots 81, one of the slots 81 is horizontal, the other slot 81 is vertical, a casing 11 sleeving the folding seat 8 is fixedly disposed at one end of the connecting beam 1 and is rotatably connected to the folding seat 8 through a connecting shaft 111, the connecting beam 1 is rectangular, a slider 12 capable of sliding in the length direction and a first connecting rod 13 are disposed in the connecting beam 1, a strip-shaped hole 14 and a stop plate 15 are disposed at a lower end of the connecting beam 1, a third hole 151 is formed in the stop plate 15, a lower end of the slider 12 stretches out of the strip-shaped hole 14 and is connected to a second connecting rod 16, the second connecting rod 16 penetrates through the third hole 151 and is connected to a stop block 17, the stop block 17 is inserted into any one of the slots 81, a compression spring 19 is disposed between the stop block 17 and the stop plate and is used for restoration, one end of the first connecting rod 13 is fixedly connected to the slider 12, and the other end of the first connecting rod 13 stretches out from the other end of the connecting beam 1 and is connected to a handle 18. When the handle 18 is pulled, the slider 12 slides to drive the stop block 17 to disengage from the slot 81, and at this moment, the connecting beam 1 rotates vertically with respect to the folding seat 8; when the slider 12 is inserted into the vertical slot 81, and the connecting beam 1 and the support beam 2 draw close to the tail of the car to be folded (see FIG. 13);

when the slider 12 is inserted into the horizontal slot 81, the connecting beam 1 and the support beam 2 are unfolded horizontally to be used for carrying the bike; and when the slider 12 designates from the slot 81 and continues to rotate downwards, the stop block abuts against the side face of the folding seat 8, and at this moment, the connecting beam 1 and the support beam 2 are inclined downwards (see FIG. 14), such that the trunk of the car can be opened by users.

Figure 15:
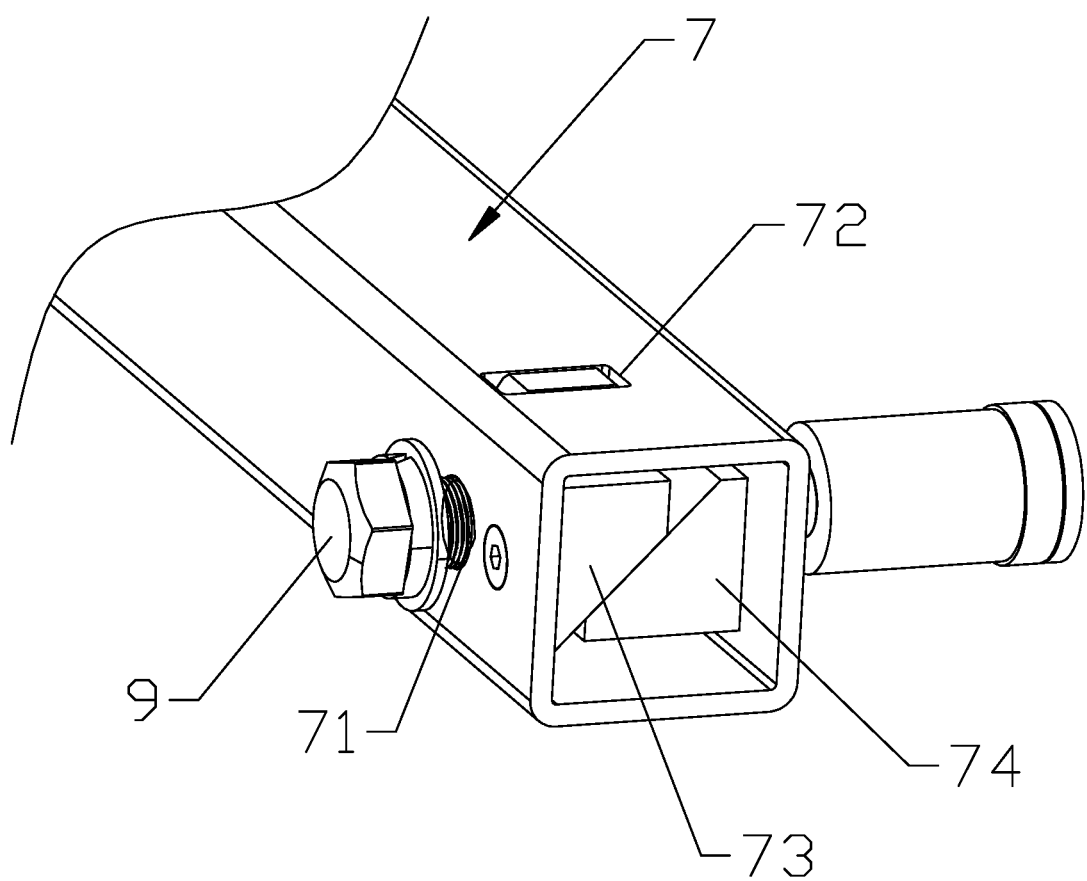
FIG. 15 is a partial structural view of the mounting tube according to the invention.
Figure 16:
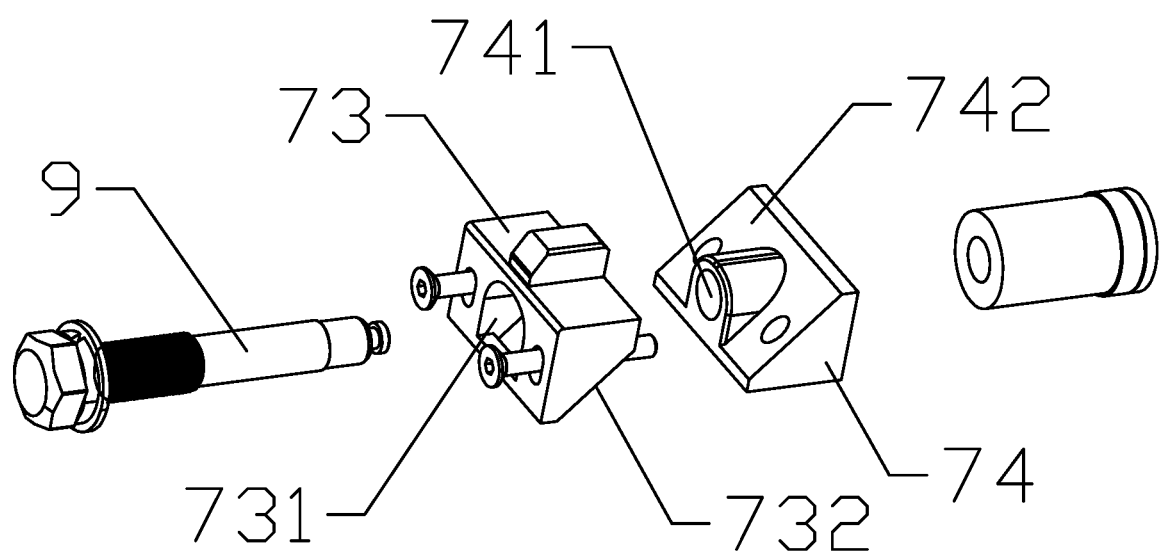
FIG. 16 is an exploded structural view of parts near the mounting tube according to the invention.

Embodiment 6: As shown in FIG. 15 and FIG. 16, this embodiment is basically identical with Embodiment 5, and differs from Embodiment 5 in the following aspects: a fourth hole 71 is formed in a left side of the mounting tube 7, an opening 72 is formed in an upper surface of the mounting tube 7, an ejection block 73 and a push block 74 are disposed in the mounting tube 7, a fifth hole 731 and a first oblique guide surface 732 inclining upwards from left to right are disposed on the ejection block 73, a second bolt hole 741 and a second oblique guide surface 742 inclining downward from right to left are disposed on the push block 74, a third bolt 9 sequentially penetrates through the fourth hole 71 and the fifth hole 731 to be connected to the second bolt hole 741 in a threaded manner, the first oblique guide surface 732 contacts the second oblique guide surface 742, and when the third bolt 9 is rotated to enable the push block 74 to move leftward, the ejection block 73 moves upward and stretches out via the opening 72.

In this embodiment, a sixth hole (not shown) is formed in a right side face of the mounting tube 7 and is located on a same axis as the fourth hole 71, and a tail of the third bolt 9 stretches out via the sixth hole to be connected to a lock.

It should be noted that the front direction, back direction, left direction and right direction of the support beam 2, the front wheel fixing assembly 3 and the rear wheel fixing assembly 4 are defined according to the placement direction of the bike, and the front direction, back direction, left direction and right direction of the mounting beam 1, the mounting tube 7 and the folding seat 8 are defined according to the direction of the car.

What is claimed is:

1. A car-mounted bike rack comprises:
   a connecting beam, and
   at least one support beam;
   wherein
   the support beam is fixedly disposed on the connecting beam, a front wheel fixing assembly and a rear wheel fixing assembly are disposed on the support beam;
   the front wheel fixing assembly comprises an arc-shaped support plate and a clamping mechanism, a convex arc surface of the arc-shaped support plate is rotatably connected to an upper surface of the support beam, and the clamping mechanism is rotatably connected to a side face of the support beam and is matched with a concave arc surface of the arc-shaped support plate to lock a front wheel of a bike;
   a rear portion of the arc-shaped support plate contacts the upper surface of the support beam initially, and when the front wheel of the bike is pushed forward into the arc-shaped support plate and is further moved forward, the arc-shaped support plate turns forward until a front portion of the arc-shaped support plate contacts the support beam; and
   a locking mechanism is disposed on a front portion of the support beam, wherein the locking mechanism locks the arc-shaped support plate in position after the arc-shaped support plate turns forward.

2. The car-mounted bike rack according to claim 1, wherein the locking mechanism comprises a mounting base, a first bolt and a nut, wherein the mounting base is fixedly disposed on a front portion of a lower surface of the support beam, a first hole is formed in the mounting base, and a lug formed with a second hole is disposed on the convex arc surface of the arc-shaped support plate; and when the front portion of the arc-shaped support plate contacts the support beam, the second hole is communicated with the first hole, and the first bolt penetrates through the second hole and the first hole to be connected to the nut in a threaded manner.

3. The car-mounted bike rack according to claim 1, wherein a front portion of the upper surface of the support beam is concaved downwards to form a locating groove matched with the convex arc surface of the arc-shaped support plate, a front end of the locating groove is communicated with a front end of the support beam, and when the arc-shaped support plate turns forward, part of the convex arc surface of the arc-shaped support plate is clamped in the locating groove.

4. The car-mounted bike rack according to claim 1, wherein a detachable support plate is disposed at a rear end of at least one support beam, and a rear end of the support plate contacts a ground.

5. The car-mounted bike rack according to claim 4, wherein a groove is formed in a rear end of the support beam, the support plate comprises an upper connecting plate and a lower connecting plate, a hook matched with the groove is disposed at an upper end of the upper connecting plate, oblique side baffles are disposed on two sides of the upper connecting plate, an upper end of the lower connecting plate is rotatably connected to a back side of the upper connecting plate, a first bolt hole and a second bolt are disposed on the lower connecting plate, and the second bolt penetrates through the first bolt hole to contact a lower end of the upper connecting plate.

6. The car-mounted bike rack according to claim 1, wherein the clamping mechanism comprises a swing arm and a clasp, wherein one end of the swing arm is rotatably connected to a side face of the support beam, a connecting end of the clasp is slidably disposed on the swing arm, and the clasp is locked on the swing arm through a locking assembly; and when the swing arm is rotated to a preset angle, the clasp is slid to be matched with the arc-shaped support plate to clamp the front wheel of the bike.

7. The car-mounted bike rack according to claim 1, wherein the car-mounted bike rack further comprises a mounting tube connected to a tail of a car, wherein a folding seat is fixedly disposed on the mounting tube, one end of the connecting beam is connected to the folding seat, and the connecting beam can be rotatably folded in a vertical direction with respect to the folding seat.

8. The car-mounted bike rack according to claim 7, wherein the folding seat is formed with two slots, one of the slots is horizontal, the other slot is vertical, a casing sleeving the folding seat is fixedly disposed at one end of the connecting beam and is rotatably connected to the folding seat through a connecting shaft, the connecting beam is rectangular, a slider capable of sliding in a length direction and a first connecting rod are disposed in the connecting beam, a strip-shaped hole and a stop plate are disposed at a lower end of the connecting beam, a third hole is formed in the stop plate, a lower end of the slider stretches out of the strip-shaped hole and is connected to a second connecting rod, the second connecting rod penetrates through the third hole and is connected to a stop block, the stop block is inserted into any one of the slots, a compression spring is disposed between the stop block and the stop plate and is used for restoration, one end of the first connecting rod is fixedly connected to the slider, and the other end of the first connecting rod stretches out from the other end of the connecting beam and is connected to a handle.

9. The car-mounted bike rack according to claim 7, wherein a fourth hole is formed in a left side of the mounting tube, an opening is formed in an upper surface of the mounting tube, an ejection block and a push block are disposed in the mounting tube, a fifth hole and a first oblique guide surface inclining upward from left to right are disposed on the ejection block, a second bolt hole and a second oblique guide surface inclining downward from right to left are disposed on the push block, a third bolt sequentially penetrates through the fourth hole and the fifth hole to be connected to the second bolt hole in a threaded manner, the first oblique guide surface contacts the second oblique guide surface, and when the third bolt is rotated to enable the push block to move leftward, the ejection block moves upward and stretches out via the opening.

\* \* \* \* \*